(No Model.)
E. L. WARD.
PLOW.
No. 481,708. Patented Aug. 30, 1892.
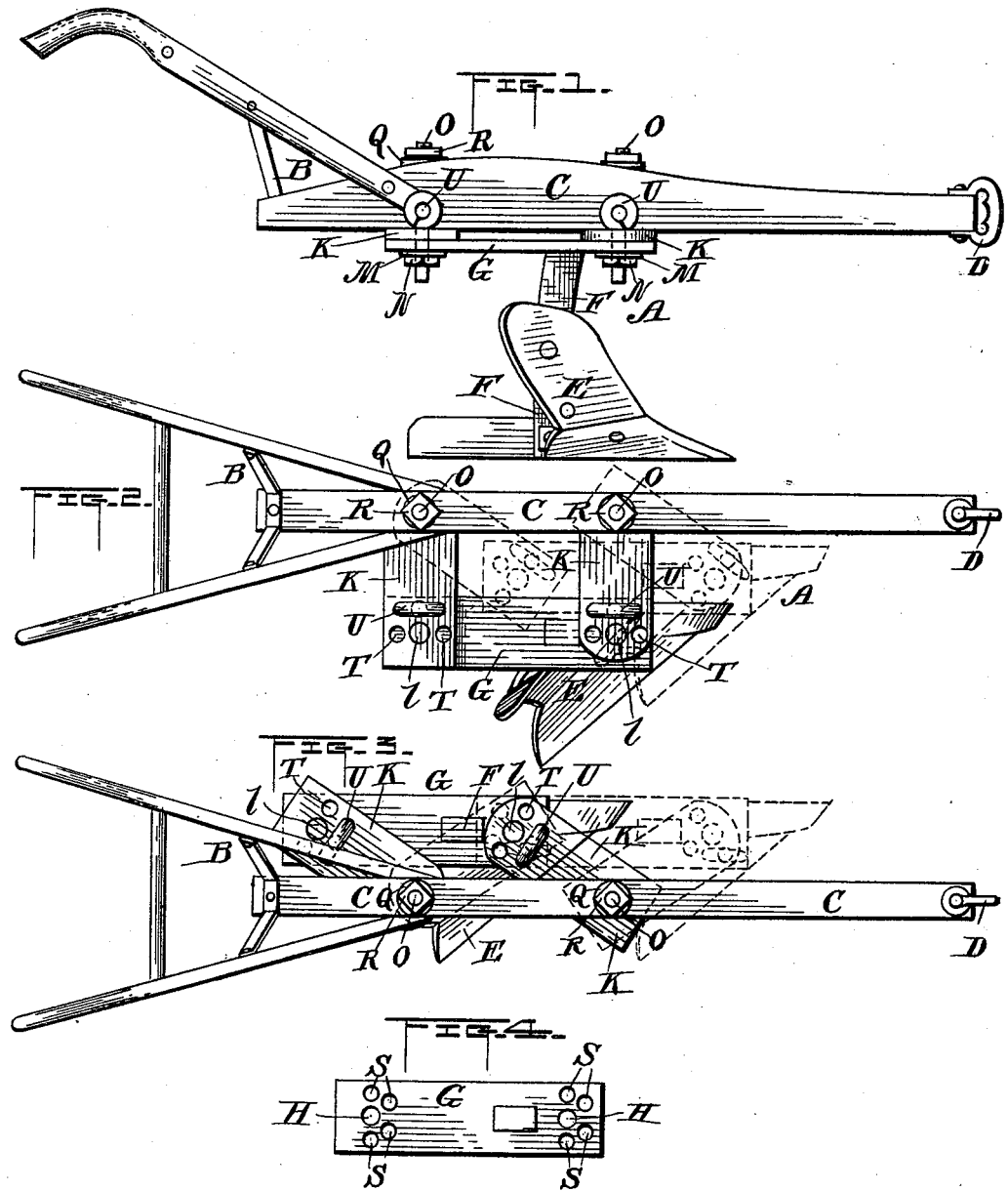
Witnesses
Severance
Ralph DasKam
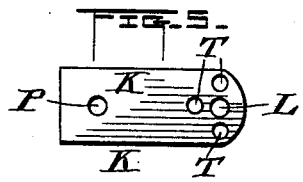
Inventor
Edward L. Ward
By John Wedderburn,
Attorney

UNITED STATES PATENT OFFICE.

EDWARD L. WARD, OF SANTA ROSA, CALIFORNIA.

PLOW.

SPECIFICATION forming part of Letters Patent No. 481,708, dated August 30, 1892.

Application filed May 25, 1892. Serial No. 434,342. (No model.)

*To all whom it may concern:*

Be it known that I, EDWARD L. WARD, of Santa Rosa, in the county of Sonoma and State of California, have invented certain new and useful Improvements in Plows; and I do hereby declare the following to be a full, clear, and exact description of the invention, such as will enable others skilled in the art to which it appertains to make and use the same.

My invention relates to improvements in plows; and its object is to provide means whereby the plowshare may be easily and quickly moved to either side of the plow-stock and there secured when it is desired to plow near to the trunks of trees; and my invention consists more particularly in the novel arrangement, construction, and combination of parts hereinafter specified, and set forth in the claim.

In the accompanying drawings, Figure 1 is a side elevation of my improved plow. Figs. 2 and 3 are plan views showing the share secured in different positions at the sides of the stock, and Figs. 4 and 5 are detail views of parts of my improved apparatus.

A represents my improved plow, which has the usual stilts B, stock C, and clevis D. The share E of the plow is secured to the post F, which, instead of being affixed to the plow-stock, as hitherto, is rigidly secured at its upper end to the horizontal plate or beam G. This beam (shown in detail in Fig. 4) is provided at or near each end with apertures, preferably five in number, of which the central ones H form at each end bearings or sockets for the pivot-bolts I, which serve to pivotally secure to the beam G the link-plates K. (Shown in detail in Fig. 5.) The plates K have likewise at one end apertures, preferably four in number, one of which L registers with one of the apertures H and receives one of the bolts I. The bolts I are secured by the washers M and nuts N underneath the beam G. The link-plates K are pivotally secured to the plow-stock by means of bolts O, passing through apertures P in the plates and through the plow-stock and secured thereto by washers Q and nuts R.

It will be seen by this arrangement that the plowshare may be swung to either side of the stock and to any distance therefrom within the limits of the link-plates and in every position retain the necessary parallelism with the plow-stock. In some of these positions the apertures S of the beam will, one or more of them, register with one or more of the apertures T of the link-plates, and thus it is then possible to retain the plowshare in such positions by inserting into the registering apertures the strong metallic pins U. In Figs. 2 and 3 two of such positions are shown by full lines and two others by dotted lines. In this way it is possible to plow much nearer to the trunks of trees than has hitherto been the case.

Having fully described my invention, what I claim, and desire to secure by Letters Patent, is—

In an implement of the class described, the combination of a plow-stock, a plowshare, parallel links connecting said share with said stock, pivotal connections of said links with said share and said stock, and a series of corresponding holes passing through said share and one end of each of said links, substantially as and for the purpose set forth.

In testimony whereof I have signed this specification in the presence of two subscribing witnesses.

EDWARD L. WARD.

Witnesses:
 JOHN T. CAMPBELL,
 GEORGE S. WARD.